(12) United States Patent
Aarestrup

(10) Patent No.: US 8,796,970 B2
(45) Date of Patent: Aug. 5, 2014

(54) METHOD FOR CONTROLLING A MULTIPHASE ELECTRIC MOTOR OPERATING IN STAR-CONNECTED MODE

(75) Inventor: Jan Caroe Aarestrup, Bjerringbro (DK)

(73) Assignee: Grundfos Management a/s, Bjerringbro (DK)

( * ) Notice: Subject to any disclaimer, the term of this patent is extended or adjusted under 35 U.S.C. 154(b) by 647 days.

(21) Appl. No.: 12/933,459

(22) PCT Filed: Mar. 20, 2009

(86) PCT No.: PCT/EP2009/002087
§ 371 (c)(1),
(2), (4) Date: Sep. 20, 2010

(87) PCT Pub. No.: WO2009/118135
PCT Pub. Date: Oct. 1, 2009

(65) Prior Publication Data
US 2011/0012545 A1    Jan. 20, 2011

(30) Foreign Application Priority Data
Mar. 22, 2008 (EP) .................................. 08005423

(51) Int. Cl.
*H02P 6/14* (2006.01)
(52) U.S. Cl.
USPC ............ 318/400.26; 318/400.01; 318/400.27; 318/400.28; 318/430
(58) Field of Classification Search
CPC ............... H02P 6/00; H02P 7/54; H02P 1/44
USPC ................. 318/775, 90, 126, 400.01, 400.07, 318/400.11, 400.14, 400.15, 400.26, 705, 318/721, 727, 785, 786, 430, 432, 445, 778, 318/799, 400.32, 101, 102, 400.27, 400.28; 361/100; 257/119; 327/446, 455, 469
See application file for complete search history.

(56) References Cited

U.S. PATENT DOCUMENTS

| | | | | |
|---|---|---|---|---|
| 4,424,474 A * | 1/1984 | Dürr et al. | .......... | 318/798 |
| 4,482,853 A * | 11/1984 | Bhavsar | .......... | 318/778 |
| 4,769,581 A * | 9/1988 | Rilly | .......... | 318/400.01 |
| 4,910,450 A * | 3/1990 | Parker et al. | .......... | 318/811 |
| 5,146,146 A * | 9/1992 | Samann | .......... | 318/768 |
| 5,637,976 A * | 6/1997 | Chen et al. | .......... | 318/809 |

(Continued)

FOREIGN PATENT DOCUMENTS

| | | | |
|---|---|---|---|
| EP | 1443635 A1 | 8/2004 | |
| EP | 1496606 A1 | 1/2005 | |
| EP | 1775823 A2 * | 4/2007 | ............. H02K 3/28 |
| GB | 2375665 A | 11/2002 | |

OTHER PUBLICATIONS

International Search Report issued Jun. 8, 2009 in International Appliction No. PCT/EP2009/002087.

*Primary Examiner* — Antony M Paul
(74) *Attorney, Agent, or Firm* — Panitch Schwarze Belisario & Nadel LLP

(57) ABSTRACT

A method serves for starting a polyphase electric motor which is operated in a star connection. The method conductively bridges at least one winding part of a phase of the motor and electrically disconnects the bridged winding part, in order in this manner, to supply a higher voltage to the remaining, electrically effective windings, and thus to increase the flow of current and thus the torque.

8 Claims, 3 Drawing Sheets

(56) References Cited

U.S. PATENT DOCUMENTS

| | | | |
|---|---|---|---|
| 5,940,576 A * | 8/1999 | de Simon | 388/811 |
| 6,566,841 B2 * | 5/2003 | Bush et al. | 318/771 |
| 7,166,974 B2 | 1/2007 | Aarestrup | |
| 8,076,890 B2 * | 12/2011 | Shoda et al. | 318/599 |
| 2006/0033458 A1 * | 2/2006 | Aarestrup | 318/254 |
| 2007/0114957 A1 | 5/2007 | Aarestrup | |

* cited by examiner

METHOD FOR CONTROLLING A MULTIPHASE ELECTRIC MOTOR OPERATING IN STAR-CONNECTED MODE

CROSS-REFERENCE TO RELATED APPLICATIONS

This application is a Section 371 of International Application No. PCT/EP2009/002087, filed Mar. 20, 2009, which was published in the German language on Oct. 1, 2009, under International Publication No. WO 2009/118135 A1 and the disclosure of which is incorporated herein by reference

BACKGROUND OF THE INVENTION

The invention relates to a method for activating a polyphase electric motor which is operated in a star connection, for starting the motor.

Modern electric motors may nowadays be activated by way of electronic controls in a manner which is largely independent of the mains frequency. However, the converter electronics, even with the application of highly integrated electronic circuits, create costs which are often similar to those of the motor. For this reason, one tends to provide activation means for inexpensively manufacturable motors of small and medium power of up to 7500 W for example, which operate with great effectiveness, i.e. at a high efficiency. Permanent magnet motors which are provided with activation electronics constructed of triacs as power switches, are particularly suitable for this on account of their high efficiency. Such triacs are assigned to the individual motor windings as switches, as having the advantage that they are inexpensively manufacturable, have, however, the disadvantage that with usual activation, it is the case of the switches latching, i.e. which after switching on, only block when the current flowing through the switch becomes zero or changes its direction.

Its is also counted as belonging to the state of the art to activate a three-phase brushless electric motor by way of a direct converter (cycloconvertor), which converts the alternating current of the mains supply such that a wave shape of a higher or lower frequency results. Moreover, the rotational speed may be reduced below the synchronous speed by way of a phase-angle control.

So-called soft-starters are also known, with which a brushless three-phase electric motor is started by way of triacs. Such soft-starters are applied in combination with three-phase motors, at whose windings the mains voltage prevails, which may be reduced by phase-angle control.

It is thus counted as belonging to the state of the art, to activate an electric motor supplied with alternating current by way of triacs, in a manner such that the motor not only be operated in a synchronous manner, but also in a super-synchronous and sub-synchronous manner.

However, phase-angle control, as such, is not sufficient to achieve a starting operation with a high moment or and increased torque for a short time. A method for the control of the firing angle of an electric motor supplied with alternating current in a single phase manner, which ensures an increased moment on starting operation of the motor as well as a smooth running once the motor is run up, and operates by way of triacs which suitably subject the main winding and auxiliary winding to current, is known from EP 1 443 635 A1. This method operates with a less complicated electronic control and inexpensive triacs and also permits the rotational speed of the motor to be controlled in quite wide ranges, and this also at a high efficiency.

BRIEF SUMMARY OF THE INVENTION

Against this background, it is the object of the invention to provide a method for activating a polyphase electric motor which is operated in a star connection, for starting the motor, with which one may achieve a high starting moment, said method being able to be carried out in an inexpensive and efficient manner.

The method according to the invention for activating a polyphase electric motor operated in a star connection, for starting the motor, envisages bridging at least one winding part of one phase of the motor in a conductive manner, and electrically separating the bridged winding part from the remaining motor. The method according to the invention is advantageously particularly applicable to brushless permanent magnet motors which are supplied with alternating current, to electronically commutated polyphase d.c. motors, and also to asynchronous motors.

The basic concept of the method according to the invention is that by way of a conductive bridging of at least one winding part or a winding of a phase of the motor, a greater voltage and thus also a greater current, and thus a greater electrical power, is supplied to the other or the remaining phases of the motor, which the motor then converts into an increased torque. With a biphase electric motor operating in a star connection, only one winding part of a phase of the motor is conductively bridged. With three-phase and polyphase electric motors operated in a star connection, a complete winding of a phase may be bridged and disconnected. The switching-off of the winding part is necessary, in order to ensure that a braking effect is not produced in the bridged winding part or in the bridged winding due to self-induction.

The method according to the invention is envisaged for starting the motor, since the motor then starts with an increased moment and thus reaches its operating rotational speed more quickly. It is to be understood that with the conductive bridging of a winding of a three-phase motor, the motor is then activated as a biphase motor and the conductively bridged winding is to be connected in an inactive manner by way of opening the electronic switch which is arranged in series in front of or behind this winding. If the motor is activated as a biphase motor, advantageously an activation is effected as is known per se from EP 1 443 635 A1.

The increased torque which may be achieved with the method according to the invention, may be applied for starting under load or also in other operating situations, in which increased torque is required. In particular with the use in combination with an electronically commutated polyphase d.c. motor, the method according to the invention may not only be applied for starting but also for running up, advantageously in the rotational speed range which lies between 80 and 100% of the synchronous rotational speed. Such motors, in particular with the application for driving centrifugal pumps, require an increased moment, in order for example during the starting operation to get from a rotational speed which corresponds to 80% of the synchronous rotational speed, to the synchronous rotational speed. In order to ensure an adequate torque in this region, usually the motor windings are designed correspondingly large, which however often leads to the motor being overdimensioned on operation at the synchronous rotational speed of the motor, and one throttles by way of phase-angle control, which is basically not desired. In contrast, with the application of the method according to the invention, the motor as a rule may be dimensioned such that, on the one hand, it reaches its synchronous rotational speed comparatively quickly, and on the other hand one does not need to throttle or throttle only minimally, on operation at the synchronous rotational speed.

According to an advantageous further formation of the method according to the invention, the bridging and disconnection is lifted after starting operation of the motor, with a brushless d.c. motor, typically on reaching the synchronous speed, or as the case may be, also a sub-synchronous or super-synchronous rotational speed, when such is envisaged with regard to control technology.

According to the invention, one likewise envisages only a part of a winding being conductively bridged and being electrically disconnected from the remaining winding part, as must be effected for example with a biphase motor for carrying out the method according to the invention, since a complete winding may not be disconnected.

According to the invention, winding parts of one, several, but not all phases are conductively bridged. Advantageously, a complete winding is conductively bridged with electric motors which are operated with more than two phases in a start connection. It is to be understood that in each case the bridged winding part or the bridged winding parts are electrically disconnected. It is particularly advantageous according to the invention, if winding parts of only one phase are bridged and electrically disconnected.

The method according to the invention is advantageously carried out with electronic switches in the form of triacs, since these are available at a low cost and are envisaged for low and medium powers.

According to a further formation of the method according to the invention, advantageously each winding and the at least one electrically conductive bridging may be connected and disconnected by way of an electronic switch, in particular a triac, wherein after the disconnection of the bridging, the electronic switches assigned to the windings are activated for speed control or energy optimisation of the motor. As explained above, at least one electronic switch is required for activating the electrically conductive bridging, for carrying out the method according to the invention. Since the bridged winding part or the bridged winding is to be disconnected, a further electronic switch is to be connected in series with this winding. These switches thus are in any case absolutely necessary for carrying out the method according to the invention.

If the winding parts of all phases are to be conductively bridged, then also electronic switches are necessarily to be connected in series in front of all windings, which are then advantageously applied on operation, i.e. after running up the motor, in order to be able to activate the motor in a manner which is optimised with regard to energy, or to be able to activate the rotational speed of the motor in a targeted manner, as is known per se. Such a speed control is possible for example with asynchronous motors, and an energy optimisation particularly with synchronous motors. Moreover, an electronic switch is to be connected in series in front of each winding in any case with brushless d.c. motors which are supplied by a.c. current mains, in order to be able to start the motor. Preferably, such switches are connected in series in front of each winding also with asynchronous motors, in order to carry out a phase-angle control or energy optimisation.

Particularly advantageously the method according to the invention is applied to a brushless, three-phase d.c. motor, which drives a centrifugal pump or is envisaged and designed for such a drive. The increased starting moment which this entails not only has advantages with regard to the earlier attainment of the synchronous speed or nominal speed, but furthermore also has the advantage that if the impeller becomes stuck, which may not be completely ruled out with pumps as may occur for example due to contamination, the pump may be set free again since an increased torque is available.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
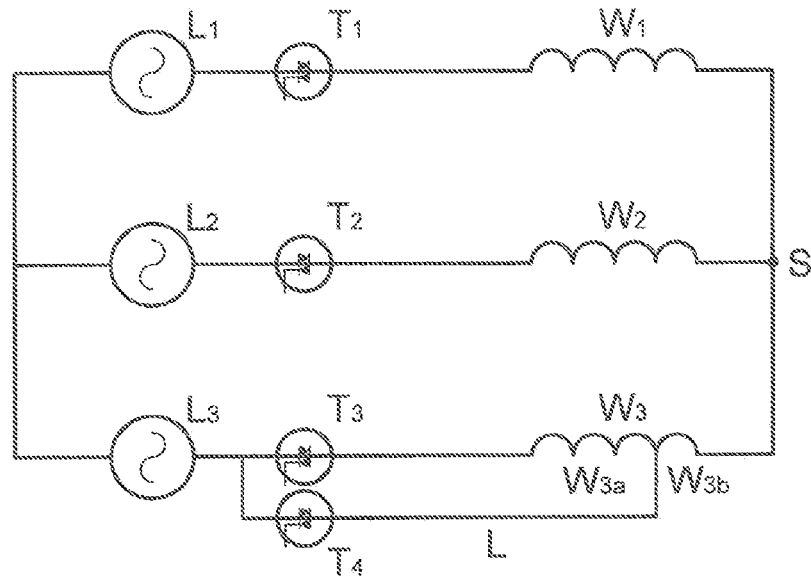
FIG. 1 a simplified circuit diagram of a three-phase electric motor operated in a star connection, of a first embodiment, FIG. 2 the simplified circuit diagram of the motor according to FIG. 1 of a second embodiment, FIG. 3 the simplified circuit diagram of the motor according to FIG. 1 of a third embodiment, FIG. 4 the simplified circuit diagram of the motor according to FIG. 1 of a fourth embodiment, FIG. 5 a simplified circuit diagram according to FIG. 1 of a first embodiment of a biphase motor and FIG. 6 the circuit diagram according to FIG. 5 of a biphase motor of a second embodiment.

The electric motor which is represented in a simplified manner by way of FIG. 1 comprises three windings W1, W2 and W3, which are connected in a star connection, thus are connected in an electrically conductive manner to one another at one end. The windings are connected to the respective connections L1, L2 and L3 of a three-phase mains supply via electronic switches in the form of triacs T1, T2 and T3.

The winding W3 is designed in a divided manner, and comprises a winding part W3a connecting to the switch T3, and a winding part W3b connecting to the star point S. Between these winding parts W3a and W3b, the winding is contacted via a conductor L which is connected to the connection L3 of the mains supply via a triac T4.

The switch T4 is closed for activating the motor with an increased torque, so that the winding part W3a of the winding W3 is conductively bridged, thus becomes ineffectual with regard to the current supply of the motor. In order, with the running of the motor, to prevent a current from being induced in the winding part W3a, and an electromagnetic effect from occurring, which disadvantageously compromises the running of the motor, the switch T3 is simultaneously opened when the switch T4 closes. The voltage prevailing at the connection L3 thus prevails at the part winding W3b, by which means the resistance of the effective winding W3 to W3b is reduced, and thus a higher current may flow through the windings W1 and W2, which permits an increased moment compared to the operation with the windings W1, W2 and W3.

Figure 2:
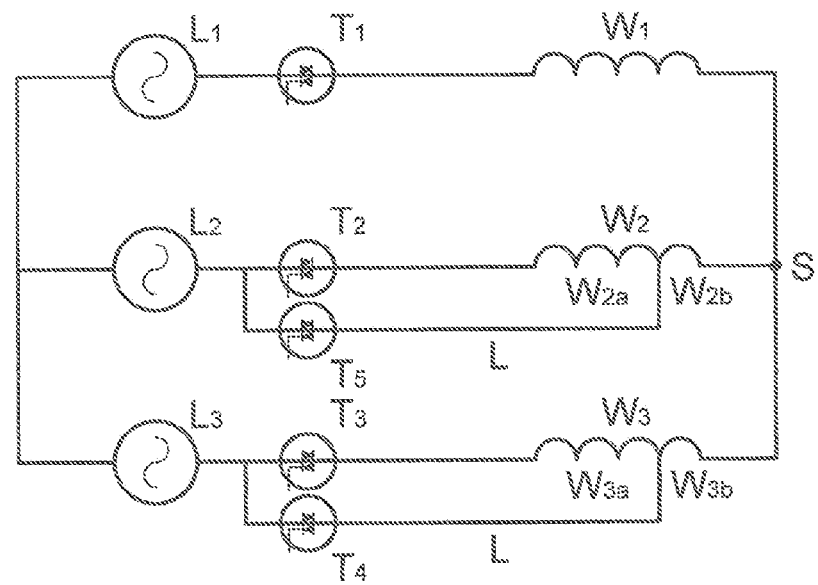

With the embodiment according to FIG. 2, not only the winding W3, but also the winding W2 is divided. There, the winding part W3a may be bridged by way of the switch T4, and the winding part W2a by way of the switch T5. Simultaneously, the respectively bridged winding part W2a and W3a may be electrically disconnected from the mains supply L2 and L3 respectively by way of the switches T2 and T3. With this circuit too, a larger current flows and thus a larger torque produced, on account of the lower resistance of the remaining electrically effective winding parts W2b and W3b.

Figure 3:
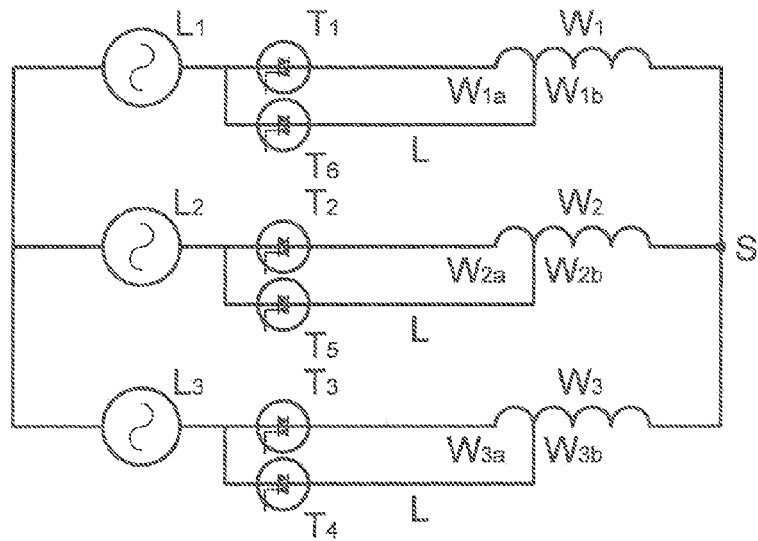

With the embodiment variant according to FIG. 3, each of the windings W1, W2 and W3 of the three-phase motor is designed in a divided manner, wherein the winding parts W1a, W2a, W3a may be respectively bridged by way of the switches T6, T5 and T4 and may be electrically disconnected from the bridged winding parts W1a, W2a and W3a by way of the switches T1, T2 and T3 which are connected in series in front of the windings. For starting the motor, one or two, but not all winding parts W1a, W2a and W3a are bridged. The bridging of all winding parts W1a, W2a and W3a may be applied for rotational speed control during operation.

Figure 4:
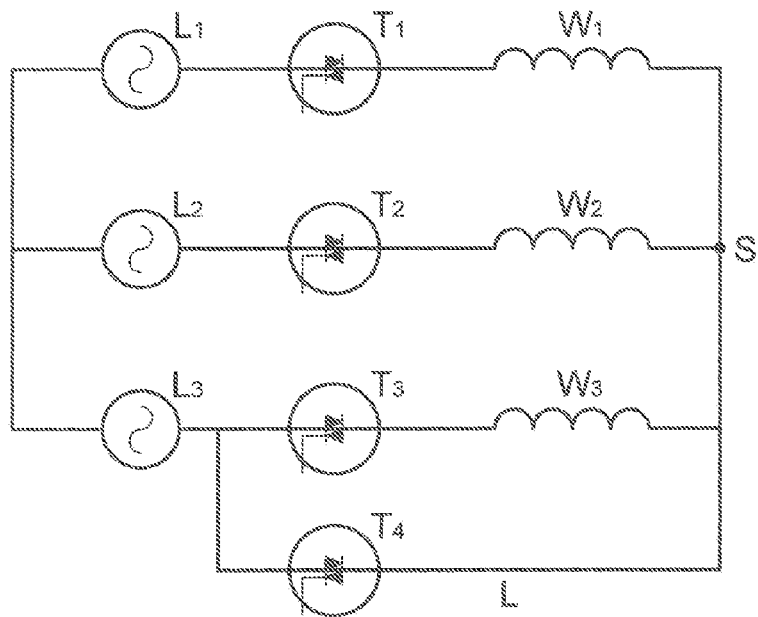

With the embodiment example according to FIG. 4, which likewise shows a three-phase brushless electric motor in a star connection, the three windings W1, W2, and W3 are not designed in a divided manner, but the winding W3 may be completely bridged by way of the conductor L. For this, a triac T4 is provided in the conductor L which connects this in parallel with the winding W3 when the switch is closed. A switch T3 which is connected in series in front of the winding W3, then serves for disconnecting the winding W3 from the mains connection L3 when this is bridged by the conductor L. With the embodiment example according to FIG. 4, when the conductor L bridges the winding W3 with a closed switch T4, the motor must be activated as a two-phase motor, since the winding W3 is switched such that it is ineffectual. With this circuit too, the motor starts with an increased moment compared to normal operation, with which the switch T4 is opened and the windings W1, W2 and W3 are connected to the mains connections L1, L2 and L3 depending on the constructional design and the operating manner of the motor.

Figure 5:
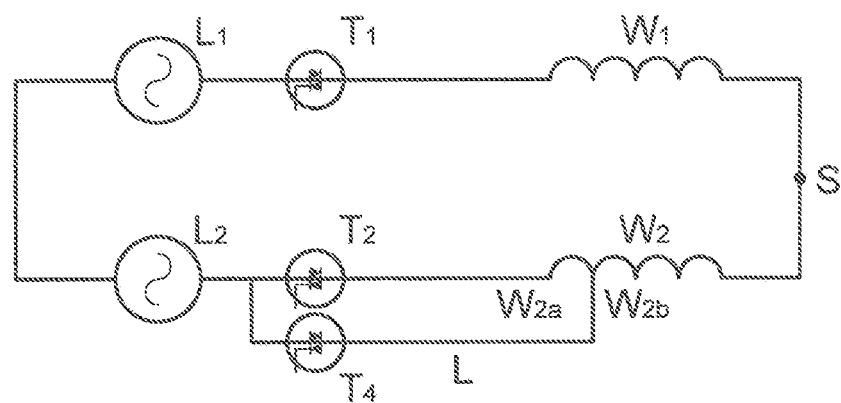

FIG. 5 shows how the method may be applied with a biphase motor. The motor comprises the windings W1 and W2 which are connected to one side in the point S and with their other side are present at the supply mains with the phases L1 and L2 separated via the switches T1 and T2. The winding W2 is divided into two winding parts W2a and W2b, wherein a conductor L is led out in the region of the division and conductively bridges the winding part W2a via a switch T4, so that the supply voltage of the connection L2 is directly present at the winding part W2b. The switch T2 which is connected in series in front of the winding W2, is opened, as described previously, in order to ensure that on starting the motor, no current is induced in the remaining winding part W2a, which is connected such that it is ineffectual.

Figure 6:
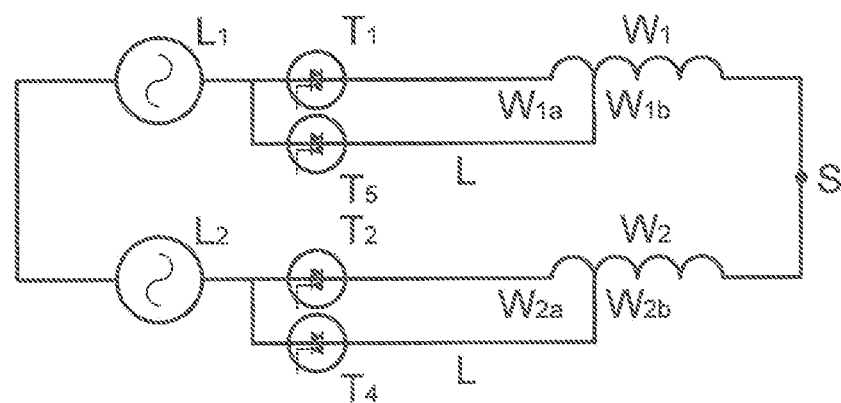

An alternative circuiting of a biphase motor is represented by way of FIG. 6, with which both windings W1 and W2 are designed in a divided manner and each of these part windings W1a and W2a may be conductively bridged by way of a conductor L by way of closing a switch T5 and T4 respectively. The switch T1 and T2 which are connected in series in front of the winding W1 and W2 respectively, is then opened. This wiring (connecting), apart from the wiring for starting the motor according to FIG. 5, which corresponds inasmuch as this is concerned for starting the motor, may in particular be used for operation of the motor after running up, similarly to the wiring according to FIG. 3.

The previously described circuit variants may be applied to a brushless, electronically commutated d.c. motor or also to an asynchronous motor. With a brushless motor, the switches T1, T2 and T3 are applied for starting, as well as advantageously for the optimisation of energy, but they may also be used for the control of the speed. With the asynchronous motor, the switches T1 to T3 are advantageously applied for speed control and/or energy optimisation. In each case, only the two switches which conductively bridge the winding part and electrically disconnect this bridged winding part from the mains supply, are required for carrying out the method according to the invention, thus with the embodiment according to FIG. 1 for example the switches T3 and T4, the switches T2 to T5 with the embodiment according to FIG. 2, four switches T1 to T6 with the embodiment according to FIG. 3, and the switches T3 and T4 with the embodiment according to FIG. 4.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for activating a polyphase electric motor operated in a star connection, for starting the motor, the method comprising conductively bridging at least one winding part in at least one but less than all of the phases of the motor such that each bridged winding part is electrically disconnected, wherein by way of the conductive bridging of the at least one winding part or one winding of the at least one but less than all phases of the motor, a greater voltage is supplied to the remaining phases of the motor having windings that are unbridged.

2. The method according to claim 1, wherein the bridging and the disconnection are discontinued after the starting of the motor.

3. The method according to claim 1, wherein the winding parts of several phases of the motor are conductively bridged.

4. The method according to claim 1, wherein the winding parts of only one phase are conductively bridged.

5. The method according to claim 1, wherein a complete winding of only one phase is conductively bridged.

6. The method according to claim 1, said activation being carried out by way of electronic switches, preferably triacs.

7. The method according to claim 1, wherein each winding and the at least one conductive bridging may be connected and disconnected by way of an electronic switch, in particular a triac, and wherein after the disconnection of the bridging, the electronic switches assigned to the windings are activated for speed control or energy optimization of the motor.

8. The method according to claim 1, wherein said activation is applied to a brushless three-phase d.c. motor, which drives a centrifugal pump or is capable of being applied to such a drive.

* * * * *